(12) United States Patent
Vesely et al.

(10) Patent No.: US 8,922,498 B2
(45) Date of Patent: Dec. 30, 2014

(54) SELF-SERVICE TERMINAL AND CONFIGURABLE SCREEN THEREFOR

(75) Inventors: Jan Vesely, Monifieth (GB); Andrew Colley, Dundee (GB); Barrie Clark, Dundee (GB)

(73) Assignee: NCR Corporation, Duluth, GA (US)

( * ) Notice: Subject to any disclaimer, the term of this patent is extended or adjusted under 35 U.S.C. 154(b) by 602 days.

(21) Appl. No.: 12/852,252

(22) Filed: Aug. 6, 2010

(65) Prior Publication Data

US 2012/0032896 A1 Feb. 9, 2012

(51) Int. Cl.
G06F 3/041 (2006.01)
G06F 3/00 (2006.01)

(52) U.S. Cl.
CPC ............. G06F 3/0418 (2013.01); G06F 3/005 (2013.01)
USPC ............................ 345/173; 345/178; 345/174

(58) Field of Classification Search
CPC .................................................... G06F 3/0418
USPC ................... 345/10, 173, 178, 419; 235/379; 348/208.5; 356/622; 701/36; 705/14, 705/43
See application file for complete search history.

(56) References Cited

U.S. PATENT DOCUMENTS

| | | | | |
|---|---|---|---|---|
| 7,344,481 | B2 * | 3/2008 | Watterson et al. | 482/54 |
| 7,644,039 | B1 * | 1/2010 | Magee et al. | 705/43 |
| 8,089,518 | B2 * | 1/2012 | Fahn et al. | 348/208.5 |
| 8,091,778 | B1 * | 1/2012 | Block et al. | 235/379 |
| 8,125,454 | B2 * | 2/2012 | Kong et al. | 345/173 |
| 2004/0075847 | A1 * | 4/2004 | McCracken | 356/622 |
| 2004/0108995 | A1 * | 6/2004 | Hoshino et al. | 345/173 |
| 2004/0160386 | A1 * | 8/2004 | Michelitsch et al. | 345/10 |
| 2005/0073503 | A1 * | 4/2005 | Fudali et al. | 345/173 |
| 2006/0279552 | A1 * | 12/2006 | Tonouchi | 345/173 |
| 2008/0100586 | A1 * | 5/2008 | Smart | 345/173 |
| 2008/0189173 | A1 * | 8/2008 | Bakar et al. | 705/14 |
| 2010/0079405 | A1 * | 4/2010 | Bernstein | 345/174 |
| 2010/0079449 | A1 * | 4/2010 | McCarthy | 345/419 |
| 2010/0188371 | A1 * | 7/2010 | Lowles et al. | 345/178 |
| 2011/0234524 | A1 * | 9/2011 | Longe et al. | 345/173 |
| 2011/0251755 | A1 * | 10/2011 | Widmann | 701/36 |

* cited by examiner

*Primary Examiner* — Gerald Johnson
(74) *Attorney, Agent, or Firm* — Michael Chan (57) ABSTRACT

A touch screen unit comprises a touch sensitive layer, a display and a processor. The processor is arranged to receive a signal indicative of a parallax error between a user's view of the touch sensitive layer and the user selectable objects displayed on the display and to correct for this parallax error.

17 Claims, 3 Drawing Sheets

SELF-SERVICE TERMINAL AND CONFIGURABLE SCREEN THEREFOR

FIELD OF THE INVENTION

This invention relates to a self-service terminal and a configurable screen therefore. More particularly, but not exclusively, this invention relates to a self-service terminal and a configurable touch screen therefore.

BACKGROUND TO THE INVENTION

Touch screens comprise a display for displaying information and icons, a transparent protective screen over the display and a touch sensitive film which overlays the protective screen. A processor receives signals from the touch sensitive film when a user touches it. The processor then maps the co-ordinates from the touch sensitive film to screen co-ordinates and outputs the touches screen co-ordinate into the Windows input stream of a controller. The controller compares the touches screen co-ordinate to the screen co-ordinates of Windows objects displayed on the display which represent icons or other user selectable options in order to determine if the user's touch lies in registry with the Windows objects. However, because the touch sensitive film is spaced apart from the display by the protective screen the registry between a user's touch point and a corresponding icon or user selectable option can be lost. In the case of a capacitive touch screen it is the thickness of the touch sensitive element itself, typically 10 mm, which causes the loss of registry, and there may not be a protective screen used.

Figure 1:
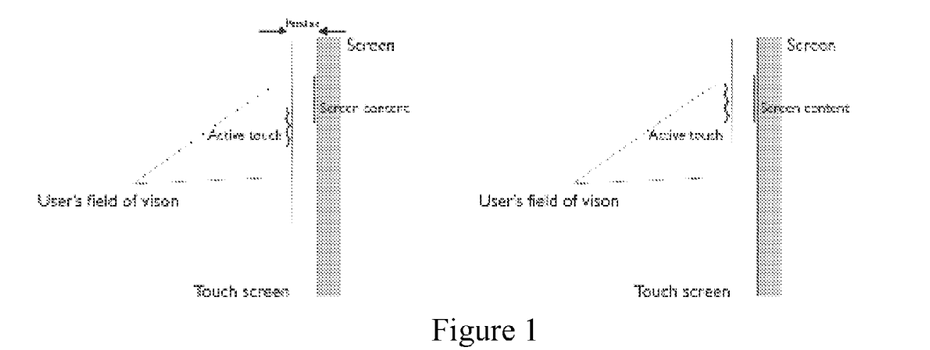
FIG. 1 is a schematic view of a prior art touch screen unit, showing the effect of parallax.

The loss of registry is typically caused by a parallax error caused by the user's line of sight differing from a naturally aligned line of sight to the screen. For example, in the case of a walk-up automated teller machine (ATM) a tall user will clearly have a significantly different line of sight from, for example, a short user or a mobility impaired user in a wheelchair. A user's touch point will occur below the icon that the user wishes to select to proceed to the next transaction step for the tall user and below the icon for a short, or wheelchair based user causing an apparent misalignment of the touch point with the icon, see for example FIG. 1. This misalignment will often cause the processor to register the user's touch as being not associated with any icon, thus the transaction will not progress. This causes user dissatisfaction.

This problem is particularly acute in the case of drive through ATMs where the height of the vehicle will alter the user's viewing perspective considerably, and thereby exacerbate misalignment due to the user's height parallax. Clearly, a driver of a sports utility vehicle will have a significantly different line of sight to a screen to a driver of a sports car. Another cause of parallax error at a drive up ATM is where the driver either overshoots or undershoots the ideal parking position, this leads to a horizontal parallax error in registry between an idealised touch point and its corresponding icon.

Attempts have been made to overcome the vertical parallax error by pivotally mounting the touch screen such that it can rotate up and down. However, such a solution has a number of difficulties associated with it such as the requirement to weatherise a moving touch screen such that there is no ingress of water into the ATM which could cause a fault with a peripheral device of the ATM, or in an extreme case even failure of the ATM. There is also engineering complexity associate with providing a drive system for rotating the touch screen, such a complex arrangement is subject to failure leading to increased downtime of the ATM, with an attendant decrease in customer satisfaction. Additionally, such a mechanical solution to this problem is not easily retrofitted to the ATMs already in the field and would thus require the replacement of a financial institution's ATMs.

SUMMARY OF THE INVENTION

According to a first aspect of the present invention there is provided a touch screen unit comprising:
 a display arranged to display a plurality of user-selectable objects;
 a touch sensitive layer overlaying the display;
 a processor arranged to
 (a) receive an alignment signal indicative of the position of a user relative to the display unit;
 (b) generate an offset based upon said alignment signal;
 (c) receive a coordinate signal indicative of a position of a user interaction with the touch sensitive layer;
 (d) map the co-ordinates of the user interaction with the touch sensitive layer to display co-ordinates;
 (e) determine if the display co-ordinates of the user interaction correspond to the display co-ordinates of one of the plurality of user-selectable objects when compensation for the offset is included; and
 (f) activate a user-selectable object from the position on the touch sensitive layer touched by the user, if the determination of step (e) is affirmative.

It will be appreciated that the term touch sensitive layer comprises any mechanism by which a user can interact with a touch screen unit, and includes, for example grid of rays just above the surface and wherein user's finger blocks some of the rays which is registered as a touch event.

Such a touch screen unit allows for either the touch point, or the displayed information, to be moved in response to a signal indicative of the position of the user, in order to maintain registry of the user's touch point with the user selectable object from the user's view point.

The unit may comprise a spacer interposed between the display and the touch sensitive layer.

The processor may be arranged to compensate for the offset by varying the display co-ordinates of the user interaction vertically. The processor may be arranged to compensate for the offset by varying the display co-ordinates of the user interaction horizontally.

The processor may be arranged to compensate for the offset by varying the display co-ordinates of at least some of the plurality of user-selectable objects vertically. The processor may be arranged to compensate for the offset by varying the display co-ordinates of at least some of the plurality of user-selectable objects horizontally.

It will be appreciated that the term "information" used herein in relation to that which is displayed on the display relates to textual, numerical and graphical information including graphical icons.

The processor may comprise a central processor of a self-service terminal. Alternatively, the processor may comprise a processor located within the touch screen unit.

The alignment signal may comprise the output from any of the following a camera comprising facial recognition software, a camera comprising object recognition software, a height sensor, a horizontal displacement sensor, a user interaction with the touch screen unit, a card reader. The user interaction with the touch screen unit may comprise selecting a preferred height from a range of heights. The user interaction with the touch screen may comprise transaction initiation.

According to a second aspect of the present invention there is provided a terminal comprising a touch screen unit according to the first aspect of the present invention The unit may comprise a spacer interposed between the display and the touch sensitive layer.

The processor may be arranged to compensate for the offset by varying the display co-ordinates of the user interaction vertically. The processor may be arranged to compensate for the offset by varying the display co-ordinates of the user interaction horizontally.

The processor may be arranged to compensate for the offset by varying the display co-ordinates of at least some of the plurality of user-selectable objects vertically. The processor may be arranged to compensate for the offset by varying the display co-ordinates of at least some of the plurality of user-selectable objects horizontally.

The terminal may comprise a camera. The camera may be arranged to capture an image of a user, and may comprise facial recognition software. The output of the facial recognition software may comprise the alignment signal indicative of the location of the user's head relative to the touch screen unit.

The camera may be arranged to capture an image of a user's vehicle, and may comprise object recognition software. The output of the object recognition software may comprise the alignment signal indicative of the location of the user's head relative to the touch screen unit.

The object recognition software may be arranged to recognise a set part of a vehicle, for example a wing mirror, door panel or window, from which an approximate location of the user's head relative to the touch screen unit can be determined by the processor.

The terminal may comprise a user sensor arranged to determine the height of a user. The output of the user sensor may comprise the alignment signal indicative of the location of the user's head relative to the touch screen unit.

The terminal may comprise a vehicle height sensor arranged to determine the height of a user's vehicle. The output of the vehicle height sensor may comprise the alignment signal indicative of the height of the user's head relative to the touch screen unit.

The terminal may comprise a displacement sensor arranged to determine the horizontal displacement of a user's vehicle relative to the touch screen unit. The output of the displacement sensor may comprise the alignment signal indicative of the horizontal displacement of the user's head relative to the touch screen unit.

the display is arranged to a user selectable display alignment object, with the processor defining a number of sub-objects within said user selectable display alignment object, the alignment signal being dependent upon which of sub-objects that a user interaction with the touch sensitive layer corresponds to.

The terminal may comprise a card reader arranged to read vehicle data indicative of the height of a user's vehicle from a user inserted card, the vehicle data may comprise the alignment data.

The terminal may comprise a self-service terminal comprising at least one of the following an ATM, a medical record entry terminal, a retail self-check out terminal, a travel self-check in terminal, a hospitality self-check in/out terminal, a DVD rental/sales kiosk According to a third aspect of the present invention there is provided a method reducing parallax error between a user selectable object displayed on a display and a point of user interaction with a touch screen unit comprising the steps of:
(a) receiving an alignment signal indicative of the position of a user relative to the display unit;
(b) generating an offset based upon said alignment signal;
(c) receiving a coordinate signal indicative of a position of a user interaction with a touch sensitive layer;
(d) mapping the co-ordinates of the user interaction with the touch sensitive layer to display co-ordinates;
(e) determining if the display co-ordinates of the user interaction correspond to the display co-ordinates of one of the plurality of user-selectable objects when compensation for the offset is included; and
(f) activating a user-selectable object from the position on the touch sensitive layer touched by the user, if the determination of step (e) is affirmative.

The method may comprise compensating for the offset by varying the display co-ordinates of the user interaction vertically. The method may comprise compensating for the offset by varying the display co-ordinates of the user interaction horizontally.

The method may comprise compensating for the offset by varying the display co-ordinates of at least some of the plurality of user-selectable objects vertically. The method may comprise compensating for the offset by varying the display co-ordinates of at least some of the plurality of user-selectable objects horizontally.

The determination of step (i) may comprise any of the following: recognising a face in a captured image using facial recognition software, recognising an element of a vehicle in a captured image using object recognition software, determining a user's height from a height sensor signal, determining a horizontal displacement using a displacement sensor signal, sensing a user interaction with the touch screen unit, reading vehicle height details from a card using a card reader. The user interaction with the touch screen unit may comprise selecting a preferred height from a range of heights. The user interaction with the touch screen may comprise initiating a transaction.

According to a fourth aspect of the present invention there is provided software which, when executed on a processor, causes the processor to:
(a) receive an alignment signal indicative of the position of a user relative to the display unit;
(b) generate an offset based upon said alignment signal;
(c) receive a coordinate signal indicative of a position of a user interaction with a touch sensitive layer;
(d) map the co-ordinates of the user interaction with the touch sensitive layer to display co-ordinates;
(e) determine if the display co-ordinates of the user interaction correspond to the display co-ordinates of one of the plurality of user-selectable objects when compensation for the offset is included; and
(f) activate a user-selectable object from the position on the touch sensitive layer touched by the user, if the determination of step (e) is affirmative.

The software of may offset co-ordinates of user interaction with the touch sensitive layer such that said co-ordinates change horizontally in response to the alignment signal. The software may offsets co-ordinates of user interaction with the touch sensitive layer such that said co-ordinates change vertically in response to the alignment signal.

The software may displace the information on the display vertically in response to the alignment signal. The software may displace the information horizontally in response to the alignment signal.

According to fifth aspect of the present invention there is provided a touch screen driver comprising a static calibration value and a dynamic user specific calibration routine, the dynamic user specific calibration routine being arranged to:

(a) receive an alignment signal indicative of the position of a user relative to the display unit;
(b) generate an offset based upon said alignment signal;
(c) receive a coordinate signal indicative of a position of a user interaction with a touch sensitive layer;
(d) map the co-ordinates of the user interaction with the touch sensitive layer to display co-ordinates; and
(e) determine if the display co-ordinates of the user interaction correspond to the display co-ordinates of one of the plurality of user-selectable objects when compensation for the offset is included.

The dynamic user specific calibration routine may be arranged to compensate for the offset by varying the display co-ordinates of the user interaction vertically. The dynamic user specific calibration routine may be arranged to compensate for the offset by varying the display co-ordinates of the user interaction horizontally.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 2:
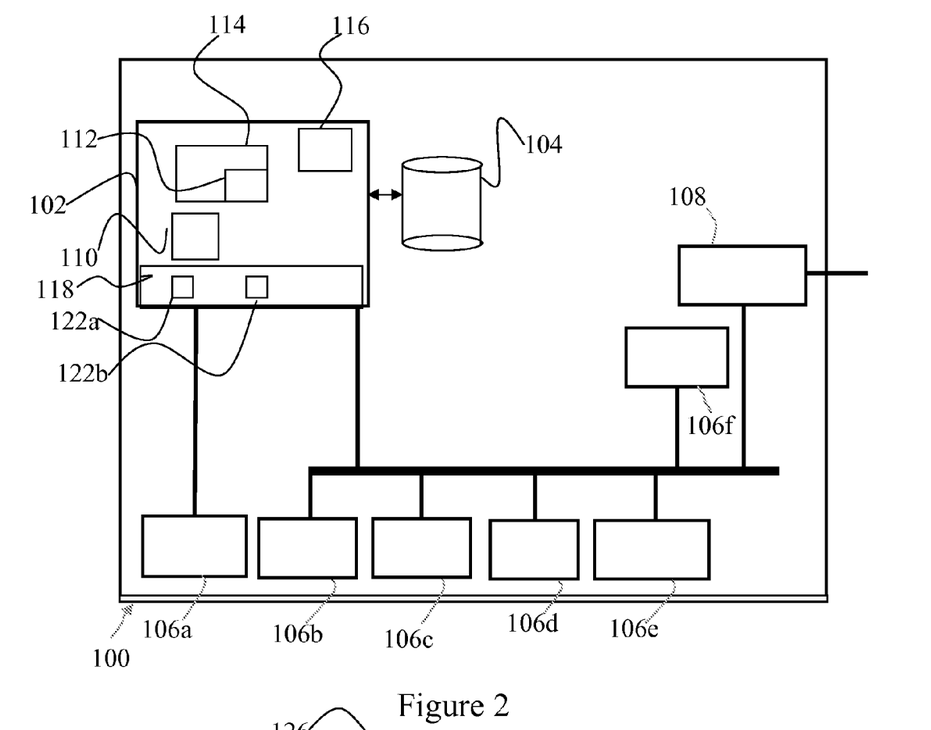
FIG. 2 is a schematic view of a first embodiment of an ATM according to an aspect of the present invention comprising an embodiment of touch screen unit according to another aspect of the present invention.
Figure 3:
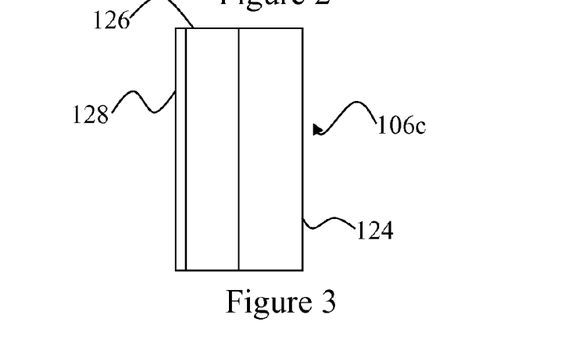
FIG. 3 is a schematic view of the embodiment of the touch screen unit of FIG. 2, showing parallax correction via displacement of a touch point.

Referring now to FIGS. 2 and 3, an ATM 100 comprises a controller 102, a data storage device 104, a number of peripheral devices 106a-f, and a network connection 108. Typically, the controller 102 is a PC core operating under a Microsoft Windows™ operating system. Normally, the data storage device 104 is a magnetic disc and may form part of the controller in some embodiments.

The controller 102 is typically a PC core running the Microsoft® Windows XP® system. The controller 102 comprises a BIOS 110 stored in non-volatile memory, a microprocessor 112 and associated main memory 114.

Typical peripheral devices found in the ATM 100 comprise, but are not limited to, a card reader device 106a, a receipt printer device 106b, a touch screen unit 106c, a camera 106d, a dispenser device 106e and an encrypting keypad 106f.

The communications network 108 comprises a secure network over which transactions data for transactions executed at the ATM 100 passes to an authorization host (not shown).

In use, the ATM controller 102 loads an operating system kernel 116 and an ATM application program 118, for example the APTRA XFS platform available form NCR Corporation of Duluth, Ga., into the main memory 114. The ATM application program 118 acts as an API mediating communications between the controller 102 and the peripheral devices 106a-f.

The application program 118 comprises a suite of routines and objects for controlling the operation of the ATM 100 such as providing the sequence of screens used in each transaction. The application program 118 also comprises a number of service providers 122, in the case of APRTA XFS these will be CEN XFS service providers. The service providers 122 control at least one, possibly many, of the peripheral devices 106a-f, and/or applications running on the ATM 100. For example, the service provider 122a which relates to the touch screen unit 106c drives both the display of screens and also monitors for user interactions with the touch screen unit 106c.

The touch screen unit 106c comprises a display 124, a spacer 126, and a touch sensitive layer 128, and typically is connected to the controller by a universal serial bus (USB) connection. The spacer 126 lies between the display 124 and the touch sensitive layer 128. The service provider 122a outputs a screen comprising icons, text and numerical information which is displayed on the display 124. A user interacts with the unit 106c by touching the touch sensitive layer 128, this generates a touch signal which passes to the service provider 122a. The service provider 122a comprises a driver which maps signals corresponding to touches on the touch sensitive layer 128 to display co-ordinates in order that a determination can be made whether a user interaction with the touch screen unit 106c corresponds to a Windows object displayed on the display 124. The mapping of the touch signal co-ordinate to a screen, or operating system, co-ordinate comprises applying a conversion factor. For example if a touch sensitive layer has a vertical co-ordinate range of 0-65535 and the display has 768 vertical pixels, as in a 1024×768 display, the conversion factor is:

$(y/65535) \times 768$ (where y is the vertical co-ordinate of the user interaction on the touch sensitive layer)

Once the conversion of the touch co-ordinate to a display co-ordinate has been carried out the converted co-ordinate passes to the Windows input screen so that the controller 102 can carry out the determination if the user interaction with the touch sensitive layer 128 corresponds to a Windows object displayed on the display 124. If the co-ordinate that the user has touched does not correspond to a Windows object on the display no further action is taken. However, if the co-ordinate the user has touched corresponds to a Windows object a further transaction step is initiated by the controller 102.

A user who is, for example, in a low lying sports car at a drive up ATM will see information on the display 124 and will touch the touch sensitive layer 128 at what they consider to be the position which corresponds to the information on the display 124. However, the parallax error is introduced by the spacer 126 means that the user will, typically, touch an area of the touch sensitive layer 128 which lies outside of a touch point 130 which corresponds to the information on the display 124. Typically, for a user viewing the unit 106c from a low position, such as a wheelchair or a low lying sports car, their viewpoint will cause them to touch the touch sensitive layer 128 below the actual touch point 130. Correspondingly, for a user viewing the unit 106c from a high position, such as a sports utility vehicle (SUV) or pick-up truck, their viewpoint will typically cause them to touch the touch sensitive layer 128 above the actual touch point 130.

Typically, as the user initiates a transaction the service provider 122a receives an alignment signal, details of the origin of the alignment signal are described hereinafter, this alignment signal provides an indication of the eye level of the user, for example in the case of a drive-up ATM a height sensor may be employed to estimate the eye level of the user from the height of the vehicle.

In one embodiment, typically, the driver receives a call from another service provider, for example a camera service provider, that a correction factor is to be applied, usually the call includes alignment data indicative of the position of the user relative to the touch screen unit. If no call is received then no correction factor is applied. Alternatively, the driver can poll other service providers to determine if they have an alignment signal to be applied. The correction factor is calculated by the service provider 122a based upon the alignment signal and the co-ordinates of the user interaction, i.e. the point at which the user touches the touch sensitive layer 128, are offset as appropriate. For example, if a driver of a SUV touches the touch sensitive layer 128 at (22,45) the service provider 112a having received an alignment signal that the user will be touching high on the layer 128 will correct this such that the output from the service provider 122a may a screen co-ordinate which corresponds to the co-ordinate (22, 43) on the touch sensitive layer 128. In the case of a linear offset, the offset can be introduced before or after conversion to the display co-ordinates. It is these offset co-ordinates are used in the determination of whether a user interaction corresponds to an active Windows object lying at a screen co-ordinate beneath the touch point. Thus, external user attributes influence the co-ordinate mapping between the touch sensitive layer and the Windows screen co-ordinates without requiring recalibration of the touch screen unit.

It will be appreciated that the offset may not be linear but may be based upon a non-linear function, such as a scaling factor where the degree of offset increases the further from the eye line of the user that the user interaction occurs, for example a sine or cosine type offset to allow for the increased parallax associated with increased distance from a line of sight.

It will be appreciated that a parking sensor associated with a drive through ATM can be used to provide a horizontal alignment signal such that parallax errors due to overshoot or undershoot of a vehicle when parking in front of the ATM can be corrected for by offsetting the co-ordinates of the user interaction horizontally.

It will be further appreciated that either a user specific, individual, correction factor may be calculated or a pre-determined correction factor based upon a collective characteristic may be applied. Such a pre-determined correction factor may be stored in a database with a corresponding height range to which a given correction factor is to be applied.

It will be appreciated that although described with reference to the offset being carried out in the driver a separate application lying above the driver can be used to carry out the offset.

It will be further appreciated that the offset is applied only for a transaction, or transactions, executed by a particular user and the driver returns to its default, no offset, configuration once said transaction, or transactions have been completed.

In an alternative embodiment, the controller 102 scrolls the Windows objects up or down within the display 124, thereby changing the screen co-ordinates at which they occur in response to the touch screen unit service provider 122a receiving the alignment signal. Thus, parallax is corrected for by moving the Windows objects, i.e. the icons, information, buttons etc., rather than providing an offset to the co-ordinates of the user's touch interaction with the touch sensitive layer 128.

It will be further appreciated that the offset is applied only for a transaction, or transactions, executed by a particular user and the driver returns to its default, non-scrolled, configuration once said transaction, or transactions have been completed.

In another embodiment, the service provider 122a has access to a number of versions of stored screens for the display of a single set of information. Typically, these screen versions are stored on data storage device 104 and are accessed via the controller 102. Each of these screen versions has the same information placed upon it, but in each screen the information is located in slightly different positions on the display 124 when displayed. The alignment signal is used to select an appropriate screen, for example "SUV screen" or "sports car screen" for display. The Windows objects on each screen are displayed in an appropriate position within the display 124 area such that the user's touch point and the information on the display 124 lie in line with each other closer to, or in, the user's line of sight.

In one embodiment, the camera 106d captures an image of an area directly in front of the ATM 100. In the case of a walk up ATM a camera service provider 122b runs a facial recognition routine, similar to that used in digital cameras, to identify the location of the user's face in the field of view of the image. Data corresponding to the location of the user's face is then passed to the touch screen unit service provider 122a as the alignment signal which then, if required, either offsets the co-ordinates of the user interaction or scrolls the Windows objects in the display 124 such that the information is moved from its default position in order to reduce the parallax error between the touch point and the information displayed on the display 124 to which the user's touch point corresponds.

In the case of the drive through ATM the camera service provider 122b can either run a facial recognition routine as described hereinbefore in relation to a walk up ATM, or it can run an object recognition routine. In the case of an object recognition routine the service provider 122b is arranged to recognise an element of a vehicle which provides an indication of the height and/or horizontal position of a vehicle, for example a wing mirror, a door panel or a window of a vehicle. The output of the camera service provider 122b is passed to the touch screen unit service provider 122a as the alignment signal. The alignment signal when object recognition is used will by necessity form an estimate of the location of the user's head. The touch screen unit service provider will, if required, offset the co-ordinates of the user interaction or scrolls the Windows objects in the display 124 such that the information is moved from its default position in order to reduce the parallax error between the touch point and the information displayed on the display 124 to which the user's touch point corresponds.

In the case where both the horizontal and vertical location of the user's head are ascertained by facial recognition, or estimated by object recognition, the alignment signal will contain elements which allow the touch screen unit service provider 122a to correct for both vertical and horizontal parallax errors due to the parking of the vehicle.

It will be appreciated in the case of a drive through ATM the camera service provider 122b may first attempt facial recognition as this is the most accurate form of user location and if this is not successful may attempt object recognition. Alternatively, the camera service provider 122b may attempt only facial recognition or object recognition.

It will be further appreciated that where, in the case of a drive through ATM, the camera 106d may capture an image of an area remote from the ATM 100 such that the correction for parallax is pre-staged prior to the user commencing their transaction.

In an alternative, or additional embodiment, the camera 106d captures an image of the user's vehicle's registration plate and the camera service provider 122b communicates this data to a remote database which then provides details of the vehicle's height which act as the alignment signal upon which the touch screen unit service provider 122a bases any parallax correction, as described hereinbefore.

In an alternative, or additional, embodiment the card reader device 106a receives a user's card which bears details of either, or both of, the user's height or/and the height of their vehicle. The height information read from the card by the card reader device 106a passes to the touch screen unit service provider 122a, which bases any parallax correction upon this height information, as described hereinbefore.

In a yet further alternative, or additional, embodiment during the initial phase of a transaction the display 124 displays a screen on which three buttons are displayed in a vertical line and typically labelled "high", "medium" and "low". The user touches the appropriate button to either their height, in the case of a walk up ATM, or their vehicle height, in the case of a drive through ATM. The touch screen unit service provider 122a logs which of the buttons the user touches and applies a pre-determined parallax correction as described hereinbefore.

Similarly, for a drive through ATM the display 124 may display three buttons, typically, labelled "left", "centre" and "right" by which the user can indicate their parking position relative to the ATM and the touch screen unit service provider 122a can apply a consequential parallax correction to the subsequent steps of the user's transaction.

In an alternative, possibly additional, embodiment the display 124 displays a single button, typically labelled "Press here to start", the touch screen unit service provider 122a defines a number of sub-objects which comprise this button. When the user touches the touch sensitive layer 128 in order to initiate a transaction the touch screen unit service provider 122a determines an offset between the sub-object corresponding to the point at which the user touched the layer 128 and the centre of the button. The service provider 122a applies a consequential parallax correction to the subsequent steps of the user's transaction based upon the offset between the idealised co-ordinates for interaction with the button and the co-ordinates of the user's of interaction with the touch sensitive layer 128.

It will be appreciated that not all ATMs will comprise a camera.

Figure 4:
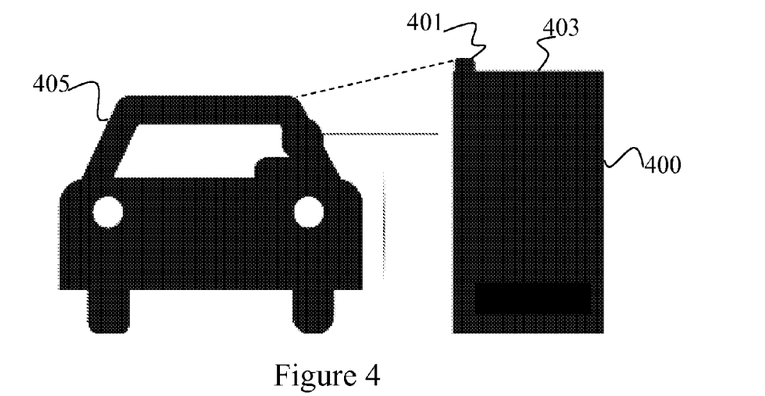
FIG. 4 is a schematic view of an embodiment of a drive through ATM according to an aspect of the present invention, the drive through ATM comprising a height sensor and further comprising a touch screen unit according to another aspect of the present invention.

Referring now to FIG. 4, a drive through ATM 400 comprises substantially the same elements as the ATM 100 described with reference to FIGS. 2 and 3, and corresponding parts are given corresponding reference numerals in the four hundred series. However, the drive through ATM 400 comprises a sensor 401 mounted the fascia 403 of the ATM 400. The sensor 401 senses the height of a vehicle 405 which is parked in front of the ATM 400. The output of the sensor 401 passes to the touch screen unit service provider 422a where a consequential parallax correction to the subsequent steps of the user's transaction is applied as described hereinbefore. It will be appreciated that the sensor 401 can be an ultrasonic sensor, an infra-red sensor or any suitable form of sensor.

In an alternative, or additional, embodiment a horizontal location sensor may be employed to estimate the horizontal location of the user following the parking of their vehicle 405. The output of this horizontal location sensor is passed to the touch screen unit service provider and processed in a similar manner as the output of the height sensor 401 to provide a horizontal parallax correction.

It will be appreciated that the height sensor and the horizontal location sensor may be located in the same housing, and may in some embodiments be the same sensor.

It will be further appreciated that the sensor 401, or sensors, be located remotely from the ATM 100 such that the correction for parallax is pre-staged prior to the user commencing their transaction.

It will be appreciated the ATM controller 102 may be configured to record user offsets associated with the touch screen unit 106c, such a user may be recognised, for example by the reading of their card in the card reader or via facial recognition software, and the appropriate parallax offset applied automatically.

Figure 5:
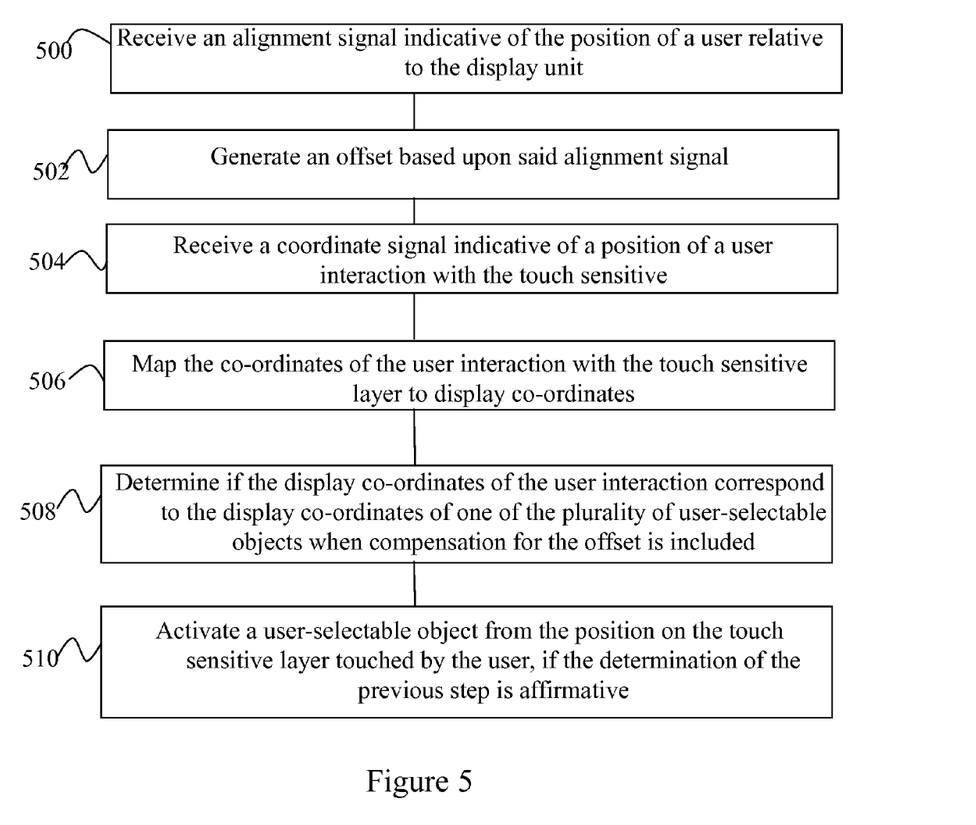
FIG. 5 is a flow chart detailing a method of reducing parallax error according to a further aspect of the present invention.

Referring now to FIG. 5, a user selectable object displayed on a display and a point of user interaction with a touch screen unit comprises receiving an alignment signal indicative of the position of a user relative to the display unit (Step 500). An offset is generated based upon said alignment signal (Step 502). A coordinate signal indicative of a position of a user interaction with a touch sensitive layer is received (Step 504). The co-ordinates of the user interaction with the touch sensitive layer to display co-ordinates are mapped (Step 506). A determination is made if the display co-ordinates of the user interaction correspond to the display co-ordinates of one of the plurality of user-selectable objects when compensation for the offset is included (Step 508). A user-selectable object from the position on the touch sensitive layer touched by the user is activated, if the determination of the previous step is affirmative (Step 510).

It will be further appreciated that although described with reference to an ATM the present invention is applicable to any suitable terminal, for example a point of sale (POS) terminal, for example to accommodate retail checkout staff or varying heights, or a self-service terminal (SST). Examples of suitable SSTs include, but are not limited to, a self-service POS terminal, an information kiosk, an electronic funds transfer (EFT) terminal a financial services centre, a bill payment kiosk, a lottery kiosk, a postal services machine, a check-in and/or check-out terminal such as those used in the retail, hotel, car rental, gaming, healthcare, and airline industries, or the like.

It will also be appreciated that the steps of the methods described herein may be carried out in any suitable order, or simultaneously where appropriate. The methods described herein may be performed by software in machine readable form on a tangible storage medium or as a propagating signal.

Various modifications may be made to the above described embodiment without departing from the spirit and the scope of the invention.

The invention claimed is:
1. An automated teller machine (ATM) comprising:
an ATM display arranged to display a plurality of ATM customer selectable objects for an ATM customer;
a camera arranged to capture a first image of an area remote from the ATM and a second image of the ATM customer;
a touch sensitive layer overlaying the display; and
a processor arranged to:
receive an alignment signal indicative of the position of an ATM customer relative to the display;
based upon the alignment signal, generate a parallax correction factor to correct for parallax error due to the position of the ATM customer relative to the display;
receive a coordinate signal indicative of a position of an ATM customer interaction with the touch sensitive layer;

map the co-ordinates of the ATM customer interaction with the touch sensitive layer to display co-ordinates;

based upon the generated parallax correction factor, determine if the display co-ordinates of the ATM customer interaction correspond to the display co-ordinates of one of the plurality of ATM customer-selectable objects; and move at least some of the plurality of ATM customer-selectable objects from the current position on the display to a different position on the display when a determination is made that the display co-ordinates of the ATM customer interaction do not correspond to the display coordinates of the one of the plurality of ATM customer-selectable objects, and thereby to correct for parallax error due to the position of the ATM customer relative to the display;

wherein (i) the alignment signal is indicative of the location of the ATM customer's head relative to the display based upon the second image, and (ii) the first image is captured such that the parallax correction factor to correct for parallax error due to the position of the ATM customer relative to the display is pre-staged prior to the ATM customer commencing the ATM transaction at the ATM.

2. The ATM of claim 1, further comprising a spacer interposed between the display and the touch sensitive layer.

3. The ATM of claim 1, wherein the processor is arranged to move the at least some of the plurality of ATM customer-selectable objects on the display by moving the at least some of the plurality of ATM customer-selectable objects on the display vertically.

4. The ATM of claim 1, wherein the processor is arranged to move the at least some of the plurality of ATM customer-selectable objects on the display by moving the at least some of the plurality of ATM customer-selectable objects on the display horizontally.

5. A method of operating a terminal to correct for parallax error between a user selectable object displayed on a display and a point of user interaction with a touch sensitive layer overlaying the display while a self-service terminal user is conducting a self-service transaction at the self-service terminal, the method comprising the steps of:

capturing a first image of an area remote from the self-service terminal and a second image of the user;

receiving an alignment signal indicative of the position of the user relative to the display;

based upon the alignment signal, generating a parallax correction factor to correct for parallax error due to the position of the user relative to the display;

receiving a coordinate signal indicative of a position of a user interaction with the touch sensitive layer;

mapping the co-ordinates of the user interaction with the touch sensitive layer to display co-ordinates;

based upon the generated parallax correction factor, determining if the display co-ordinates of the user interaction correspond to the display co-ordinates of one of the plurality of user-selectable objects; and activating a user-selectable object from the position on the touch sensitive layer touched by the user when the display co-ordinates of the user interaction are determined to correspond to the display co-ordinates of one of the plurality of user-selectable objects based upon the generated parallax correction factor;

wherein (i) the alignment signal is indicative of the location of the user's head relative to the display based upon the second image, and (ii) the first image is captured such that the parallax correction factor to correct for parallax error due to the position of the user relative to the display is pre-staged prior to the user commencing the self-service transaction at the self-service terminal.

6. The method according to claim 5, wherein the method is performed by a computer having a memory executing one or more programs of instructions which are tangibly embodied in a program storage medium readable by the computer.

7. A self-service terminal comprising:

a camera arranged to capture a first image of an area remote from the self-service terminal and a second image of a user;

a display arranged to display a plurality of user-selectable objects for a user of the self-service terminal;

a touch sensitive layer overlaying the display; and a processor arranged to:

receive an alignment signal indicative of the position of a user relative to the display;

based upon the alignment signal, generate a parallax correction factor to correct for parallax error due to the position of the user relative to the display;

receive a coordinate signal indicative of a position of a user interaction with the touch sensitive layer;

map the co-ordinates of the user interaction with the touch sensitive layer to display co-ordinates;

based upon the generated parallax correction factor, determine if the display co-ordinates of the user interaction correspond to the display co-ordinates of one of the plurality of user-selectable objects; and activate a user-selectable object from the position on the touch sensitive layer touched by the user when the display co-ordinates of the user interaction are determined to correspond to the display co-ordinates of one of the plurality of user-selectable objects based upon the generated parallax correction factor;

wherein (i) the alignment signal is indicative of the location of the user's head relative to the display based upon the second image, and (ii) the first image is captured such that the parallax correction factor to correct for parallax error due to the position of the user relative to the display is pre-staged prior to the user operating the self-service terminal.

8. The self-service terminal according to claim 7, further comprising:

a card reader arranged to receive a user's card which bears details of the user's height and to read the details to provide alignment data which is representative of the alignment signal indicative of the position of the user relative to the display.

9. The self-service terminal according to claim 7, further comprising:

a user sensor arranged to determine the height of a user, the output of the user sensor comprising the alignment signal indicative of the location of the user's head relative to the display.

10. The self-service terminal according to claim 7, further comprising:

a camera comprising facial recognition software, and arranged to capture an image of a user, wherein the output of the facial recognition software comprises the alignment signal indicative of the location of the user's head relative to the display.

11. The self-service terminal according to claim 7, wherein the self-service terminal comprises at least one of the following: an ATM, a medical record entry terminal, a retail self-check out terminal, a travel self-check in terminal, a hospitality self-check in/out terminal, a DVD rental/sales kiosk.

12. The self-service terminal according to claim 7, wherein the processor is arranged to activate a user-selectable object from the position on the touch sensitive layer touched by moving at least some of the plurality of ATM customer-selectable objects from the current position on the display to a different position on the display when a determination is made that the display co-ordinates of the ATM customer interaction do not correspond to the display co-ordinates of the one of the plurality of ATM customer-selectable objects, and thereby to correct for parallax error due to the position of the ATM customer relative to the display.

13. The self-service terminal according to claim 12, wherein the processor is arranged to move the at least some of the plurality of ATM customer-selectable objects on the display by moving the at least some of the plurality of ATM customer-selectable objects on the display vertically.

14. The self-service terminal according to claim 12, wherein the processor is arranged to move the at least some of the plurality of ATM customer-selectable objects on the display by moving the at least some of the plurality of ATM customer-selectable objects on the display horizontally.

15. A method of operating a drive through automated teller machine (ATM) to correct for parallax error between an ATM customer selectable object displayed on an ATM display and a point of ATM customer interaction with a touch sensitive layer overlaying the ATM display while the ATM customer is conducting an ATM transaction at the drive through ATM, the method comprising the steps of:

capturing a first image of an area remote from the ATM and a second image of a vehicle of the ATM customer;

receiving an alignment signal indicative of the position of the ATM customer relative to the ATM display;

based upon the alignment signal, generating a parallax correction factor to correct for parallax error due to the position of the ATM customer relative to the ATM display;

receiving a coordinate signal indicative of a position of an ATM customer interaction with the touch sensitive layer;

mapping the co-ordinates of the ATM customer interaction with the touch sensitive layer to display co-ordinates;

based upon the generated parallax correction factor, determining if the display co-ordinates of the ATM customer interaction correspond to the display co-ordinates of one of the plurality of ATM customer selectable objects; and activating an ATM customer selectable object from the position on the touch sensitive layer touched by the ATM when the display co ordinates of the ATM customer interaction are determined to correspond to the display coordinates of one of the plurality of ATM customer selectable objects based upon the generated parallax correction factor;

wherein (i) the alignment signal is indicative of the location of the ATM customer's head relative to the display based upon the second image, and (ii) the first image is captured such that the parallax correction factor to correct for parallax error due to the position of the ATM customer relative to the display is pre-staged prior to the ATM customer commencing the ATM transaction at the drive through ATM.

16. The method according to claim 15, wherein the captured image of the ATM customer's vehicle includes the vehicle's registration plate.

17. The method according to claim 15, wherein the method is performed by a computer having a memory executing one or more programs of instructions which are tangibly embodied in a program storage medium readable by the computer.

* * * * *